Jan. 8, 1957 P. B. CLARK 2,777,049
LIGHT SIGNAL PROJECTOR
Filed Dec. 30, 1952 4 Sheets-Sheet 1

INVENTOR.
Philip B. Clark
BY
Attorney

Jan. 8, 1957   P. B. CLARK   2,777,049
LIGHT SIGNAL PROJECTOR
Filed Dec. 30, 1952   4 Sheets-Sheet 2

INVENTOR.
Philip B. Clark
BY
Attorney

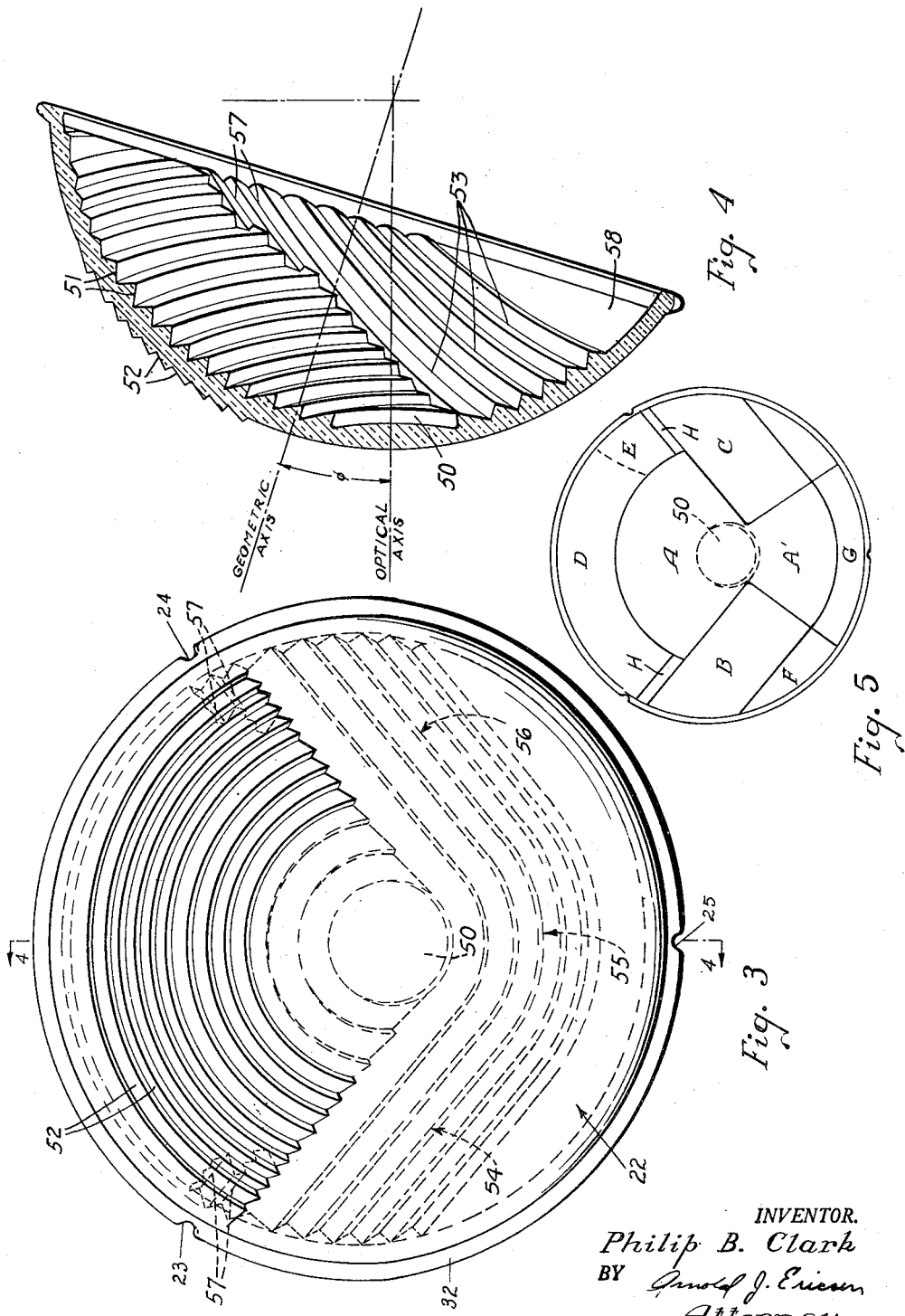

Jan. 8, 1957  P. B. CLARK  2,777,049
LIGHT SIGNAL PROJECTOR
Filed Dec. 30, 1952  4 Sheets-Sheet 4

INVENTOR.
Philip B. Clark
BY
Arnold J. Ericsen
Attorney though this hereinafter described optical system may be used in conjunction with presently manufactured and marketed devices to provide a satisfactorily operable unit functioning within the scope of the invention. The present device is entirely operable with either a fixed focus lamp or movable projector lamps, the latter being either jointly operated from the current supplied to the light source, or by separately operated pilot circuit controls.

2,777,049
LIGHT SIGNAL PROJECTOR

Philip B. Clark, South Milwaukee, Wis., assignor to McGraw Electric Company, Milwaukee, Wis., a corporation of Delaware Application December 30, 1952, Serial No. 328,631

10 Claims. (Cl. 240—1.2)

The present invention relates to light signal projectors, and particularly pertains to an optical system functioning therewith.

It has been long established that the light distribution and arrangement of the light beams emitted from projectors used for guiding aircraft during landing and take-off operations must provide a substantially uniform light intensity over the path of the aircraft, and that the light sources of these projectors must be visible to the pilot with equal intensity. This arrangement substantially eliminates any glaring or blinding effect on the pilot's eyes as he proceeds along the flight path. Signal light projectors for airport runways have generally become accepted for use as a supplemental landing aid used in conjunction with instrument approach systems, as it is generally conceded that visual reference to the ground is still imperative for safe, regular landings during adverse flying weather.

During the past decade or more, there have been contributed to the art numerous advancements relating to contact or runway light projectors. In general, these contributions have pertained to projectors that use either a multiplicity of light sources or that incorporate a plurality of light refractors in combination with a single light source. Each of these individual refractors had prismatic configurations that complemented one another to provide the desired light distributions, but which required separate expensive molding operations. The next step in the development of runway light projectors was the contribution of the controllable-beam mechanism, which included a motor-operated carriage for moving the light source relative to a focusing portion of the lens. This device was operated from a separate set of pilot circuit controls.

One of the latest achievements in this field has been to provide a light projector that incorporates a beam-control mechanism that operates conjointly responsive to the energy supplied to the projector lamp, which energy in turn is reflected in the candle power output of the light source emitted from the optical system. This device has been fully described and claimed in the copending applications, Serial No. 323,656, filed on December 2, 1952, by Philip B. Clark, and Serial No. 323,655, filed on December 2, 1952, by Joseph G. Atwood and Philip B. Clark, as joint inventors. Both of these applications are assigned to the same assignee as the present invention.

The present invention is directed to an optical system that is preferred for the effective operation of the projector described and claimed in the above-mentioned copending applications. However, it is to be noted that the hereinafter described optical system may be used in conjunction with presently manufactured and marketed devices to provide a satisfactorily operable unit functioning within the scope of the invention. The present device is entirely operable with either a fixed focus lamp or movable projector lamps, the latter being either jointly operated from the current supplied to the light source, or by separately operated pilot circuit controls.

It is an object of the present invention to provide a light signal projector having an optical system providing a preferred light distribution and arrangement of the light beam to give a substantially uniform light intensity over the path of approaching or departing aircraft, and when combined with like projectors along an airport runway, will provide light sources that are visible to the aircraft pilot in substantially equal intensity.

It is another object of the present invention to provide a light signal projector having an optical system including opposed light refracting lenses that may be completely interchanged with one another without requiring modification of the lens or any part of the projector, which projector may further include a single light source emitting projected rays from opposed directions relative to the projector.

It is a further object of this invention to provide a lens for a light projector that includes light refracting areas having a bull's-eye portion and curvilinear portions arranged about the bull's-eye, in addition to providing striated prisms, preferably arranged in angularly disposed sets in a plane tangential to a plane concentric with the bull's-eye; permitting a lens structure that may be rotated on its axis to be completely interchangeable in the openings of a dual beam projector.

These and other important objects of the present invention will become more apparent from the following detailed description when read in conjunction with the drawings, in which:

Fig. 3 is an elevational view of the interchangeable concavo-convex lens as viewed towards the convex surface.

Fig. 4 is a sectional view of the lens taken on lines 4—4 of Fig. 3, further illustrating the desired angular deflection between the optical and geometric axes.

Fig. 5 is a diagrammatic view of the lens taken at substantially the same plane as Fig. 3, and indicating the various prismatic areas contributing to a preferred light distribution.

Figure 1:
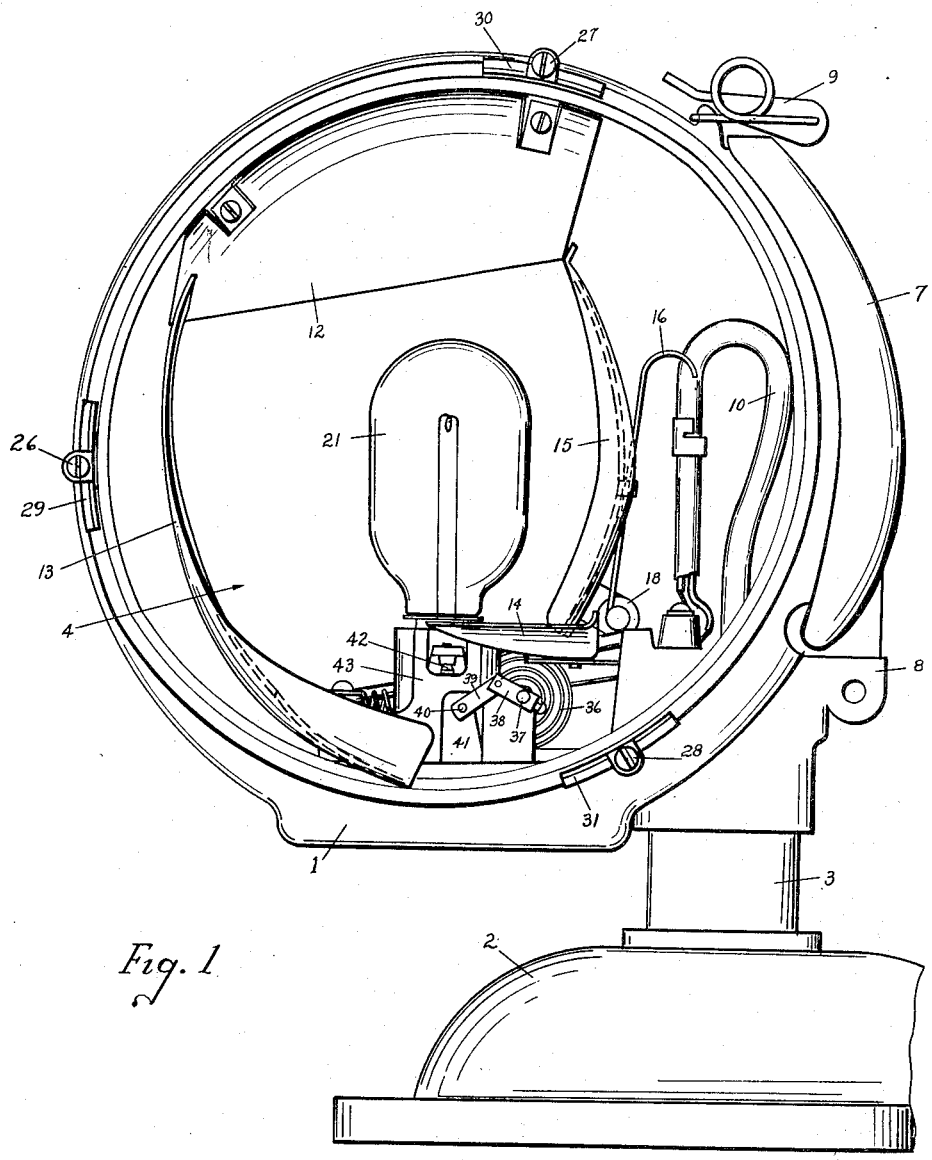
Fig. 1 is a side elevational view of the projector with the lenses removed.

Referring now to the drawings, and especially to the structure illustrated by Figs. 1 and 2, the various components of the optical system are preferably arranged for inclusion with a light projector that takes the form described in connection with the copending Atwood and Clark application. The projector which best exemplifies this invention preferably comprises a dual-lens structure having a single light source capable of emitting suitable light flux, and which may be in the form of a conventional projector lamp; or which may be in the form of a lamp in the nature of that described and claimed in the copending application, Serial No. 321,447, filed by Harry V. Leida on November 19, 1952, and assigned to the same assignee as the present invention. However, for purposes of describing the present invention, it will be assumed that a controllable mechanism, adapted to actuate a conventional projector lamp providing a movable light source, will be used as has been described under the teachings of the above-mentioned Atwood and Clark application.

The projector comprises a housing 1, which may be of cast material and is suitably mounted on, and vertically spaced and supported from, the base member 2 by means of a vertical support 3. The preferred housing is provided with opposed lens-receiving openings 4 and 5. However, it will be understood that one opening will suffice for certain installations. It is to be noted from Fig. 2, that the outer surfaces of the openings preferably define intersecting dihedral planes. That is, the plane of each opening is disposed at an angle which provides a relatively larger portion at the base of the projector than at the top, and which further provides a distended portion on the runway side of the housing. The runway side of the housing is at the top, as viewed in Fig. 2.

A resilient, weather-tight, channel-shaped gasket 6 is disposed along the periphery of each of the openings 4 and 5. The runway side of the housing is provided with a maintenance-entrance door 7, which is pivotally supported at its base by a pair of spaced trunnion members 8 integral with the housing. The opposite or free end of the door may be conveniently releasably latched to the housing by means of a conventional spring-type latch 9. Suitable electrical connections are provided by means of the conductor 10.

The projector is provided with suitable reflectors. The preferred embodiment, specifically illustrated and described herein, comprises a dual-lens unit including reflectors that are each symmetrical about an axis to provide substantially the same reflective characteristics in opposite signal directions relative to the dual openings 4 and 5. The reflectors are preferably fabricated from a material that is either inherently capable of providing specular reflective characteristics, or that may be coated or plated with a material of such nature. As shown in Figs. 1 and 2, the reflector combination includes a top reflector 12, a front reflector 13, a bottom reflector 14 and a pivotably mounted back reflector 15.

In addition to reflecting and directing light rays, the top reflector 12 acts as a thermal reflector for directing heat away from the upper portions of the projector housing where the thermal currents tend to accumulate. If the temperature is permitted to rise at any particular portion, it will be apparent that severe thermal strains may be set up in the lens ware, especially in cases where the projector lamp is energized to provide a relatively high candlepower output under extreme cold weather conditions. The back reflector 15 may be mounted directly on the door 7 to provide access to the interior of the projector (not shown), or may be independently pivotally mounted, as shown. The mounting shown in Fig. 1 provides a convenient access, and in addition, permits a relatively larger reflective area under the limitations of the opening covered by the maintenance-entrance door 7. The reflector 15 is biased towards closed position, as shown, by a pivot spring 16, the outer end of which acts as a releasable latching means engageable with the head of a machine screw 17 when it is desirable to provide access to the interior mechanism. Both the spring 16 and the reflector are pivotally positioned from trunnions 18.

The light source, comprising a standard projector-type lamp 21, is adapted to emit light flux radially of its filament for signalling within an arbitrarily defined sphere with the filament as its theoretical center. The projector, when used for aircraft guiding purposes, is normally positioned with a companion projector positioned on the opposite side of the runway to provide a series of lamp pairs arranged nearly coextensive with the runway. It is therefore desirable to utilize the projector at its maximum capacity, which is to project light to substantially all portions of a hemisphere defined at its base by the ground level, said light being directed and concentrated to selected sectoral portions by the reflectors used in combination with prismatic configurations forming a part of the refracting lens as will be described hereinbelow with relation to Figs. 5 and 6.

The light refracting lenses, generally denoted by the reference character 22, are arranged to be received by the openings 4 and 5, and are preferably cast from identical molds, and are preferably provided with indexing notches 23, 24 and 25 radially spaced from one another at the outer periphery of the generally concavo-convex lens. The notches on the lens are arranged to be seated and piloted by the lens-retaining clamps 29, 30 and 31 to the housing and the outer flange 32 of the lens.

The indexing means has been specifically arranged to insure the correct positioning of the lens by field maintenance personnel without need for instruction or supervision. As has been previously stated, one of the major benefits derived from the present invention is that the lenses are completely interchangeable with one another and may be cast from a single or identical mold. However, to obtain the desired light signal characteristics, the novel prismatic configurations are preferably oriented in a specific manner with respect to the housing.

The indexing and retaining screws 26, 27 and 28 are positioned in tapped openings that have been located on either side of the housing in a predetermined manner. That is, a preferred arrangement defines a triangular figure (especially illustrated by the notches 23, 24 and 25 of the lens 22 shown in Fig. 3) defined by imaginary chords connecting each notch, wherein two sides are equidistant and one of the notches (in this cast, notch 25) is positioned at an apex at a plane bisecting the optical axis.

The lens 22 is preferably mounted with the plane of its flanged base intersecting dihedral planes. The prismatic, light refracting configurations are therefore developed about an optical axis which is angularly disposed from the geometric axis of the otherwise symmetrical lens. This deflection is measured by the angle $\phi$, illustrated in Fig. 4. This particular lens mounting arrangement and lens construction provides for a very economical housing structure. The dihedral mounting arrangement provides enough surface area on one side of the housing to allow for an access opening, which opening is normally covered by the door 7. It will be apparent, however, that several mounting arrangements (not shown) may be provided for the lens to achieve the same ultimate light distribution characteristics as will hereinafter be defined.

It will also be understood that although the lens is preferably provided with an integrally deflected focal axis, the structure may incorporate a lens having its focal axis concentric with the geometric axis. The latter lens would be preferably mounted on a housing with an opening defining relatively more acute angles measured from both the horizontal and the vertical (not shown).

Figure 6:
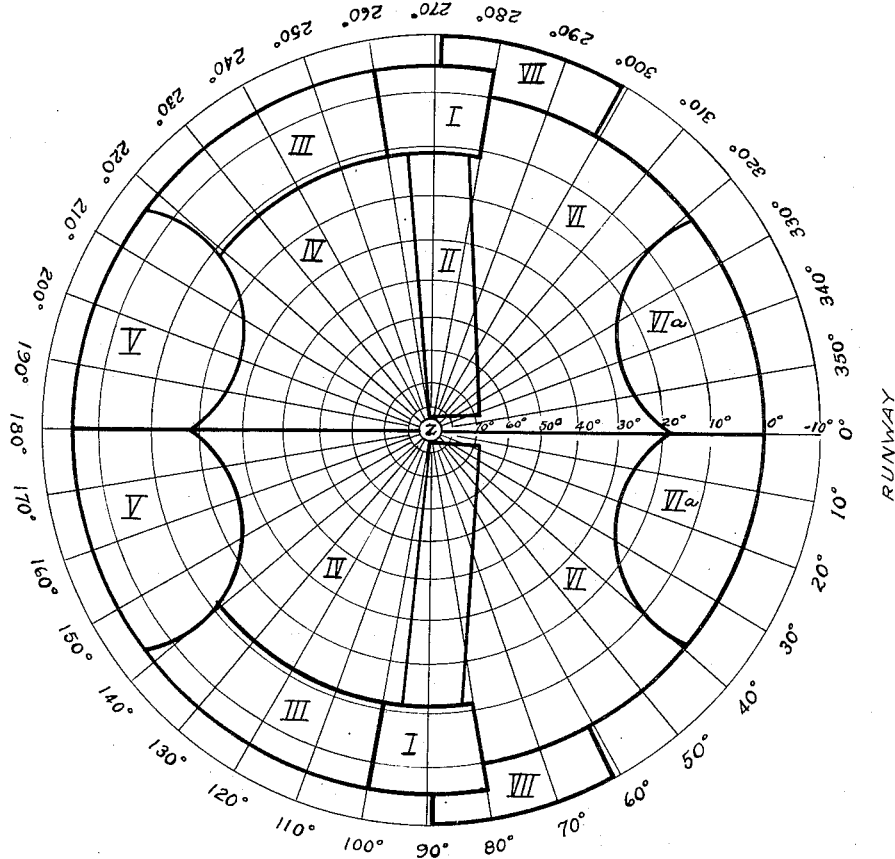
Fig. 6 is a diagrammatic view illustrating the preferred light distribution pattern provided by the novel projector.

Attention is directed to Figs. 3, 4, and 5, which specifically illustrate the novel lens, in addition to Fig. 6, which indicates the desired light distribution provided by the lamp-reflector-lens combination. The projector is assumed to be in normal operating position at a point directly below the zenith Z of Fig. 6.

The light focusing portion of the lens is defined by certain prismatic configured areas, which have been designated by alphabetical reference characters on the diagrammatic view of Fig. 5, as a convenient means of describing the operating characteristics of the preferred lens on a comparative basis with the light distribution pattern illustrated in Fig. 6. As has been previously stated, the optical axis of the lens is angularly disposed from the geometric axis, with all configured areas preferably being generated about the optical axis. A bull's-eye prismatic area 50 is provided concentrically of the optical axis, and preferably internally of the lens. A series of curvilinear prisms 51, 52 preferably define circular arcs generated about the optical axis concentrically with the bull's-eye 50. The arcuate prisms 51 and 52 are placed on opposite surfaces of the lens and generally define the areas A, D, and E of Fig. 5 to provide an elevated, relatively intense light signal. The cross-section of the prisms is, of course, dependent upon the refractive index of the light transmitting media used in the manufacture of the lens, in addition to the desired signal direction and other well-known factors effecting prism design, such as ease in separation of the lens and the manufacturing mold.

A series of preferably continuous prisms are denoted by the reference numeral 53 of Fig. 4, and comprise three major portions generally denoted in Fig. 3 by the numerals 54, 55, and 56. Referring to the diagram of Fig. 5, it will be seen that the series of prisms 53 define the general prismatic areas B, A′ and C. The portion 55 of the prisms 53 preferably comprises a series of concentric curvilinear prisms defining circular arcs generated about the optical axis concentrically of the bull's-eye 50 and oppositely of the prisms 51 and preferably on the inner surface of the lens 22, to provide area A′ of Fig. 5.

Each of the arcuate prisms defining the arcuate portion 55 terminate at each end in the generally diverging portions 54 and 56, respectively. The prisms 53 comprising the striated portions 54 and 56 are preferably arranged substantially parallel with one another following the lens contour. The portions 54 and 56, providing areas B and C of Fig 5, are angularly disposed relative to one another, and terminate at one end in their respective arcuate prisms 55 at points tangent therewith. The portions 54 and 56 define substantially equal angles with the vertical plane passing through the optical axis in order to provide a lens structure that is rotatable about its axis to be interchangeable in either of the opposed openings 4 or 5. It is to be understood that although, for manufacturing reasons, the prisms 52 are continuous, the major portions 54, 55 and 56 could be provided separately and individually to obtain certain light signal characteristics defined by areas B, A′ and C taken in relation to Fig. 6, as will later be described. Opposed striated prisms 57 are positioned at either side, and are substantially parallel with portions 54 and 56 to provide areas H in the diagram of Fig. 5.

Thus, it will be seen that the areas B and C may be substituted for one another to provide substantially identical light refracting characteristics as far as the lens itself is concerned, apart from the reflectors and/or lamp position.

As has been previously stated, areas D and E comprise arcuate prisms 51 and 52, which are preferably arranged concentrically of the bull's-eye 50. The areas D and E intercept the opposed areas H to provide desired light signals as will be described in connection with Fig. 6. The prisms of areas D and E substantially fill the area lying between the area A and the mounting flange 32, further defined by the areas H.

The lens surface 58, as marked in Fig. 4, defines areas F and G, and preferably does not include prismatic configurations. It is the practice to have these areas be provided by the transparent media itself. However, it is conceivable that the areas may be provided with prismatic striations, or the like, to modify light projecting characteristics, as will hereinafter be described.

The function of the various configured areas will now be described in conjunction with Fig. 6, which is a light distribution diagram approximating the light pattern provided by the signal projector when incorporating the dual-lens combination. The diagram represents an imaginary hemisphere having its zenith Z directly above the projector and its equator (0°) substantially horizontal with the physical axis of the projector. The distribution diagram has been marked off into certain defined areas designated by Roman-numeral reference characters. It should also be noted that the circular diagram relates to a single projector, and that in actual practice, wherein it is usual to position the projectors in pairs on opposite sides of the runway, certain of the light distribution zones of one projector may overlap certain projected areas of the opposite projector. It is to be noted that the diagram is preferably oriented as shown with the 90° radial projection parallel with the runway.

The diagram of Fig. 6 is by no means a complete illustration of the exact light distribution, but is presented as a means of illustrating the optical contribution of the lens, in combination with the various reflectors and the light source which together comprise the optical system of the preferred projector unit. It will be apparent that zone I of the diagram illustrates the main signal beam, which is provided principally by the areas A and A′ of the lens, whereas the striated prismatic portion 54 comprising area B contribute principally to zone II, in addition to distributing light to zone VIa. Zone III of the diagram is contributed to by the prismatic area C. Area D of the lens contributes principally to zone IV on the distribution pattern. Zones III and IV represent projected light necessary for general circling of airplanes prior to landing, while zones III and V especially signal for circling during the final approach, and include the azimuth (0°) and a few degrees above azimuth. It is to be further noted that under modern commercial flying practice, the desired circling signal may be upward of 3 miles, inasmuch as the modern commercial aircraft have a relatively larger circling radii. The present invention more than adequately meets the demand for light signals in the circling zones.

Zone V of the distribution diagram is provided by the combination of the area E of the lens and the back reflector 15. The front reflector 13 contributes to zone VIa, while the bottom reflector projects light that would otherwise fall on the relatively non-reflective mechanism. The back reflector contributes by intercepting light that would otherwise fall on the door 7 and directs it towards the area E of the lens, and consequently to zone V. The front reflector intercepts light from the housing and directs it through areas B and F to zone VIa.

Zone VII constitutes the ground illumination and is provided principally by the area G on the lens and secondarily by the area F. The ground illumination has been found to be of considerable benefit, inasmuch as it is generally deemed preferable to elevate the projector to a position which is above normal snow level. However, with the projectors elevated in this manner, there is often a deceptive perspective relationship between the runway surface and the lights as seen by an approaching pilot. That is, under various adverse weather conditions the pilot may see the runway lights, but may not be able to relate them to the runway. By lighting the runway surface, the pilot will be able to correctly adjust for the elevated distance of the lens above the runway without being let down an unexpected few feet prior to touching his wheels to the ground. As has been previously stated, the top reflector 12 is used for the dual purpose of deflecting conducted heat rays away from the upper surface of the projector to the lower, cooler surfaces, in addition to acting as a secondary reflector for directing light rays to focal areas where they will be used to greater advantage.

Figure 7:
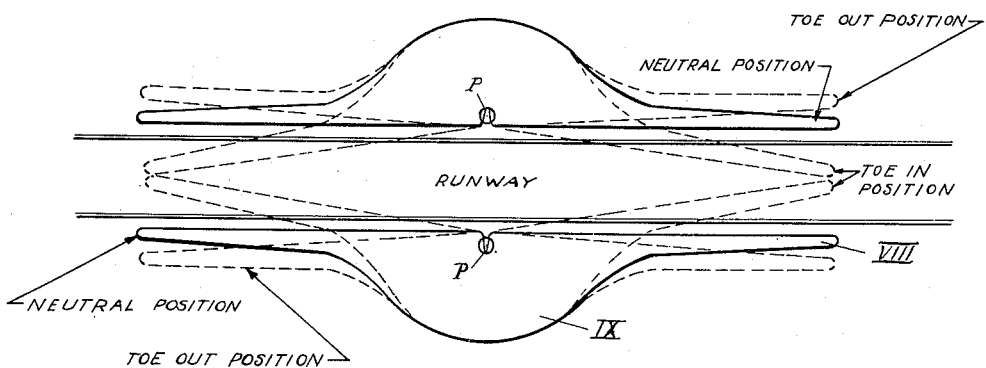
Fig. 7 is a diagrammatic view illustrating the effective movement of the projected light signal with relation to the relative position of the light source.

Referring now to Fig. 7, wherein there is illustrated another light distribution diagram which is representative of various light patterns emitted by the novel projectors P, as viewed vertically from above the projector. It will be apparent that the projectors P, as shown therein, comprise dual-lens units, and further represents a single pair of projectors mounted opposite one another on either side of the runway, and representative of a series of projectors (not shown) which may be arranged nearly coextensive with the runway, if so desired. The solid line designated "neutral position" is representative of a fixed focus projector, and is also indicative of the lateral light distribution provided by the normal operating position of a projector specifically illustrated in Figs. 1 and 2, and further described and claimed in the copending application filed by Joseph G. Atwood and Philip B. Clark. As illustrated herein, this projector includes a controllable lamp mechanism which is preferably arranged to be directly responsive in movement to electrical energy supplied to the lamp filament. It will be apparent that energy is supplied responsive to the intensity desired to penetrate a given adverse weather condition. The lamp 21 is preferably pivotally mounted as shown, and is adapted to be rocked to the right and to the left of the optical axis of the lens 22. This movement is provided by a prime mover, such as a helically formed bimetallic actuator (not herein shown). The actuator terminates at one end in a spirally wound bimetallic ambient temperature compensator 36, and at the other end in a crank shaft 37. Tailored pivotable movement is provided from the crank shaft through a crank 38, to a connecting link 39 rotatably engaging a pivot member 40 attached to the lamp cradle 41. The cradle 41 is pivotally mounted on a pivot member 42 integral with a stationary frame assembly 43.

Relating the movement of the lamp 21 to the light distribution diagram of Fig. 7, it will be noted that the portion indicated generally by the reference character VIII comprises light zones I and II of Fig. 6, while the hump-like area IX generally comprises zones III, IV and V of Fig. 6.

Movement of the lamp 21 about its pivot member 42 provides the varying positions indicated by the diagram of Fig. 7. It is to be noted, that in actual practice where the movement of the lamp is tailored to the energy supplied to the lamp filament, the beam will be shortened or lengthened accordingly. However, for purposes of this discussion, the various zones have been kept at substantially the same dimensions irregardless of their position.

Figure 2:
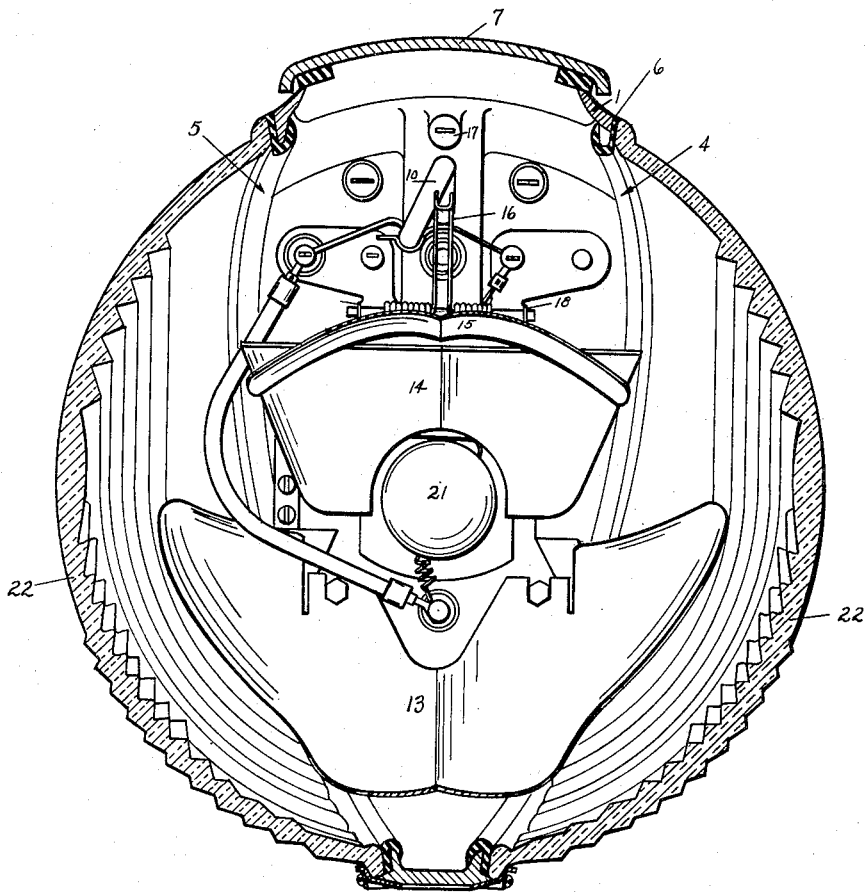
Fig. 2 is a sectional view, as viewed from the top in Fig. 1, and taken on a horizontal intermediate plane. The lenses are shown in section in operating position, and various internal elements, except for the front and back reflectors, which are shown in full lines.

When the lamp is actuated to be rocked about its pivot member 42 in a clockwise direction as viewed in Fig. 1, the light signal emitted will take the position indicated as "toe in" position. Consequently, a rotation of the lamp 21 in a counterclockwise direction is indicated as the "toe out" position on the diagram of Fig. 7. It will be apparent that under low visibility conditions, the intensity of the lamp will be increased, and in accordance with the teachings of the Atwood and Clark application, the projected light beams will be deflected to "toe in" with respect to the runway to provide a strong light signal which is composed of the beams emanating from the paired companion projectors.

Having now particularly described and ascertained the nature of the present invention and in what manner the same may be performed, I declare that what I claim is:

1. A concavo-convex lens having light refracting areas comprising a bull's-eye consisting of a series of concentric circular prisms, substantially uniform in refractive characteristics throughout their entire arcuate length, a series of striated prisms disposed about said bull's-eye and each prism of said series comprising major portions including a curvilinear portion terminating at at least one end in an outwardly diverging prismatic portion, and a series of curvilinear prisms disposed about said bull's-eye oppositely of said curvilinear portion and terminating at at least one end thereof at said diverging portion of said striated prisms.

2. A concavo-convex lens having light refracting areas comprising a bull's-eye consisting of a series of concentric circular prisms, substantially uniform in refractive characteristics throughout their entire arcuate length, a series of striated prisms disposed about said bull's-eye and each prism of said series comprising three major portions including an intermediate curvilinear portion terminating at both ends in outwardly diverging prismatic portions, and a series of curvilinear prisms disposed about said bull's-eye oppositely of said curvilinear portion and terminating at each end thereof at said diverging portions of said striated prisms.

3. A concavo-convex lens having light refracting areas comprising a bull's-eye consisting of a series of concentric circular prisms, substantially uniform in refractive characteristics throughout their entire arcuate length, a series of striated prisms disposed about said bull's-eye and each prism of said series comprising major portions including a circular arcuate portion concentric to said bull's-eye and terminating at at least one end in an outwardly diverging prismatic portion, and a series of circular arcuate prisms concentric with said bull's-eye and positioned oppositely of said arcuate portion and terminating at at least one end thereof at said diverging portion of said striated prisms.

4. A concavo-convex lens having light refracting areas comprising a bull's-eye consisting of a series of concentric circular prisms, substantially uniform in refractive characteristics throughout their entire arcuate length, a series of striated prisms disposed about said bull's-eye and each prism of said series comprising three major portions including an intermediate circular arcuate portion concentric to said bull's-eye and terminating at both ends in outwardly diverging prismatic portions, and a series of circular arcuate prisms concentric with said bull's-eye and positioned oppositely of said intermediate arcuate portion and terminating at each end thereof at said diverging portions of said striated prisms.

5. A concavo-convex circular lens having light refracting areas comprising a bull's-eye consisting of a series of concentric circular prisms substantially uniform in refractive characteristics throughout their entire arcuate length and having their common axis disposed angularly of the geometric axis of revolution of said lens, a series of striated prisms disposed about said bull's-eye and each prism of said series comprising major portions including a curvilinear portion terminating at at least one end in an outwardly diverging prismatic portion, and a series of curvilinear prisms disposed about said bull's-eye oppositely of said curvilinear portion and terminating at at least one end thereof at said diverging portion of said striated prisms.

6. A concavo-convex circular lens having light refracting areas comprising a bull's-eye consisting of a series of concentric circular prisms substantially uniform in refractive characteristics throughout their entire arcuate length and having their common axis disposed angularly of the geometric axis of revolution of said lens, a series of striated prisms disposed about said bull's-eye and each prism of said series comprising three major portions including an intermediate circular arcuate portion concentric to said bull's-eye and terminating at both ends in outwardly diverging prismatic portions, and a series of circular arcuate prisms concentric with said bull's-eye and positioned oppositely of said intermediate arcuate portion and terminating at each end thereof at said diverging portions of said striated prisms.

7. In an airport runway light projector comprising a housing having an opening, and a light source alternatively movable transversely relative to the geometric axis of said opening, the combination with a concavo-convex lens having light refracting areas comprising a bull's-eye consisting of a series of concentric circular prisms substantially uniform in refractive characteristics throughout their entire arcuate length, a series of striated prisms disposed about said bull's-eye and each prism of said series comprising major portions including a curvilinear portion terminating at at least one end in an outwardly divergent prismatic portion, and a series of curvilinear prisms disposed about said bull's-eye oppositely of said curvilinear portion and terminating at at least one end thereof at said diverging portion of said striated prisms.

8. In an airport runway light projector comprising a housing having an opening, and a light source alternatively movable transversely relative to the geometric axis of said opening, the combination with a concavo-convex lens having light refracting areas comprising a bull's-eye consisting of a series of concentric circular prisms substantially uniform in refractive characteristics throughout their entire arcuate length, a series of striated prisms disposed about said bull's-eye and each prism of said series comprising three major portions including an intermediate circular arcuate portion concentric to said bull's-eye and terminating at both ends in outwardly diverging prismatic portions, and a series of circular arcuate prisms concentric with said bull's-eye and positioned oppositely of said intermediate arcuate portion and terminating at each end thereof at said diverging portions of said striated prisms.

9. In an airport runway light projector comprising a housing having opposed openings lying in dihedral planes and a light source alternatively movable transversely relative to the geometric axes of said openings, the combination with an interchangeable concavo-convex lens in each opening, each lens having light refracting areas comprising a bull'e-eye consisting of a series of concentric circular prisms substantially uniform in refractive characteristics throughout their entire arcuate length, a series of striated prisms disposed about said bull's-eye and each prism of said series comprising major portions including a curvilinear portion terminating at at least one end in an outwardly divergent prismatic portion, and a series of curvilinear prisms disposed about said bull's-eye oppositely of said curvilinear portion and terminating at at least one end thereof at said diverging portion of said striated prisms.

10. In an airport runway light projector comprising a housing having opposed openings lying in dihedral planes and a light source alternatively movable transversely relative to the geometric axes of said openings, the combination with an interchangeable concavo-convex lens in each opening, each lens having light refracting areas comprising a bull's-eye consisting of a series of concentric circular prisms substantially uniform in refractive characteristics throughout their entire arcuate length, a series of striated prisms disposed about said bull's-eye and each comprising three major portions including an intermediate circular arcuate portion concentric to said bull's-eye and terminating at both ends in outwardly diverging prismatic portions, and a series of circular arcuate prisms concentric with said bull's-eye and positioned oppositely of said intermediate arcuate portion and terminating at each end thereof at said diverging portions of said striated prisms.

References Cited in the file of this patent

UNITED STATES PATENTS

| | | |
|---|---|---|
| 1,407,427 | Kloneck | Feb. 21, 1922 |
| 1,861,752 | Patterson | June 7, 1932 |
| 1,960,148 | Gage | May 22, 1934 |
| 2,133,377 | Cullman | Oct. 18, 1938 |
| 2,192,019 | Schepmoes | Feb. 27, 1940 |
| 2,462,222 | Pennow | Feb. 22, 1949 |
| 2,493,087 | Rolph | Jan. 3, 1950 |
| 2,655,591 | Clark | Oct. 13, 1953 |

FOREIGN PATENTS

| | | |
|---|---|---|
| 276,040 | Great Britain | Jan. 19, 1927 |

OTHER REFERENCES

Landing Aids Experiment Station final report for 1947 on Airfield Lighting, pp. 7 and 8 cited.